Figure 5:
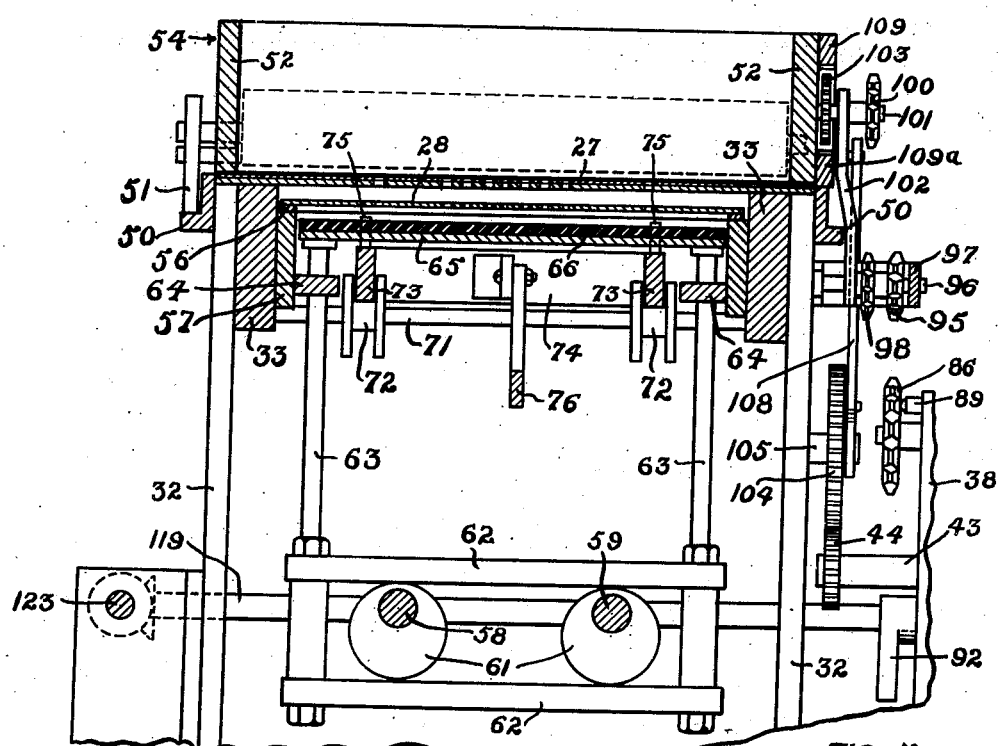

Nov. 28, 1939.   F. S. BUNKER   2,181,573
MEANS FOR AFFIXING JEWELS IN PERFORATED PLATES
Original Filed Nov. 3, 1936   6 Sheets-Sheet 1
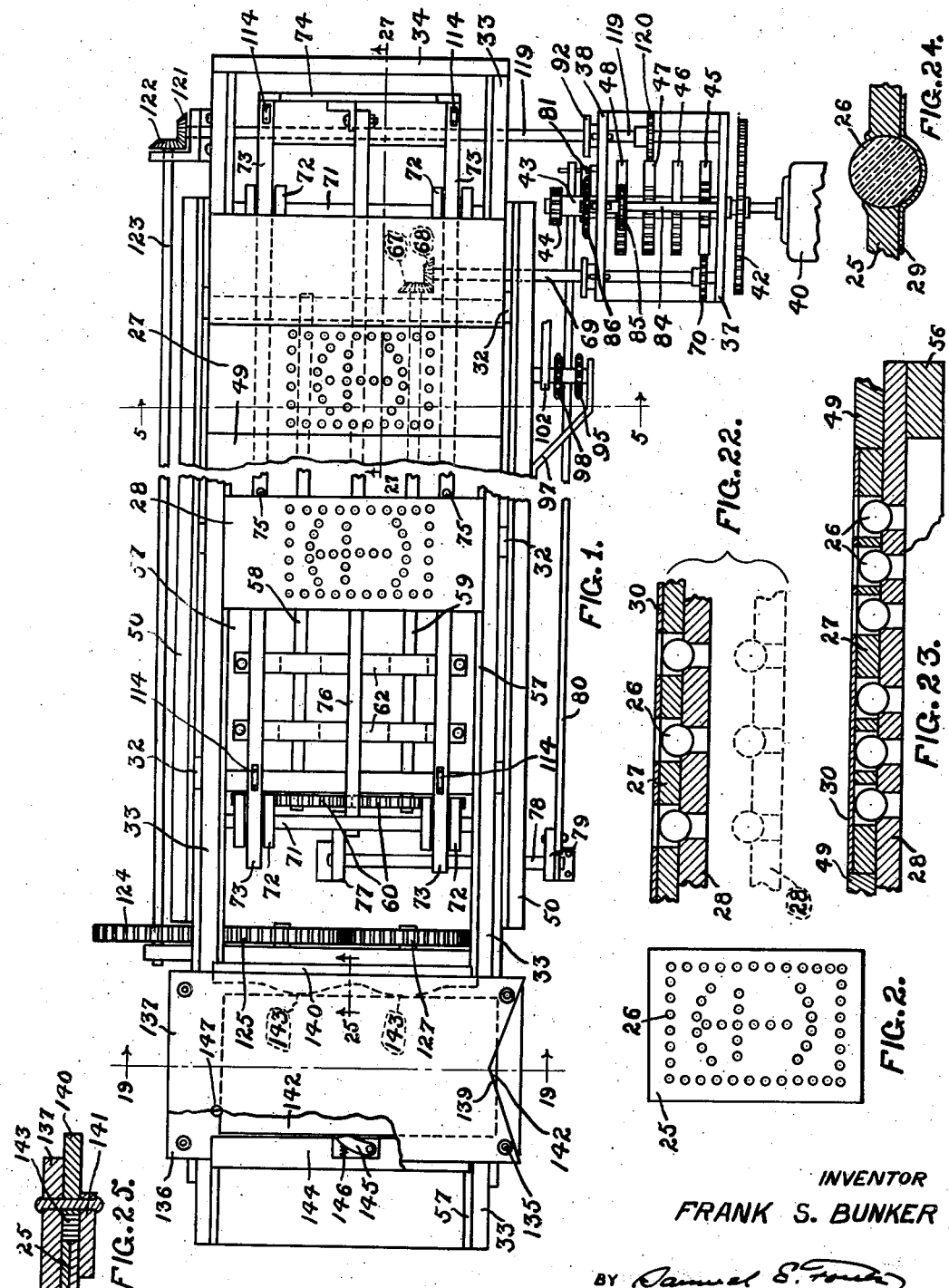
INVENTOR
FRANK S. BUNKER
ATTORNEY Nov. 28, 1939.    F. S. BUNKER    2,181,573
MEANS FOR AFFIXING JEWELS IN PERFORATED PLATES
Original Filed Nov. 3, 1936    6 Sheets-Sheet 2
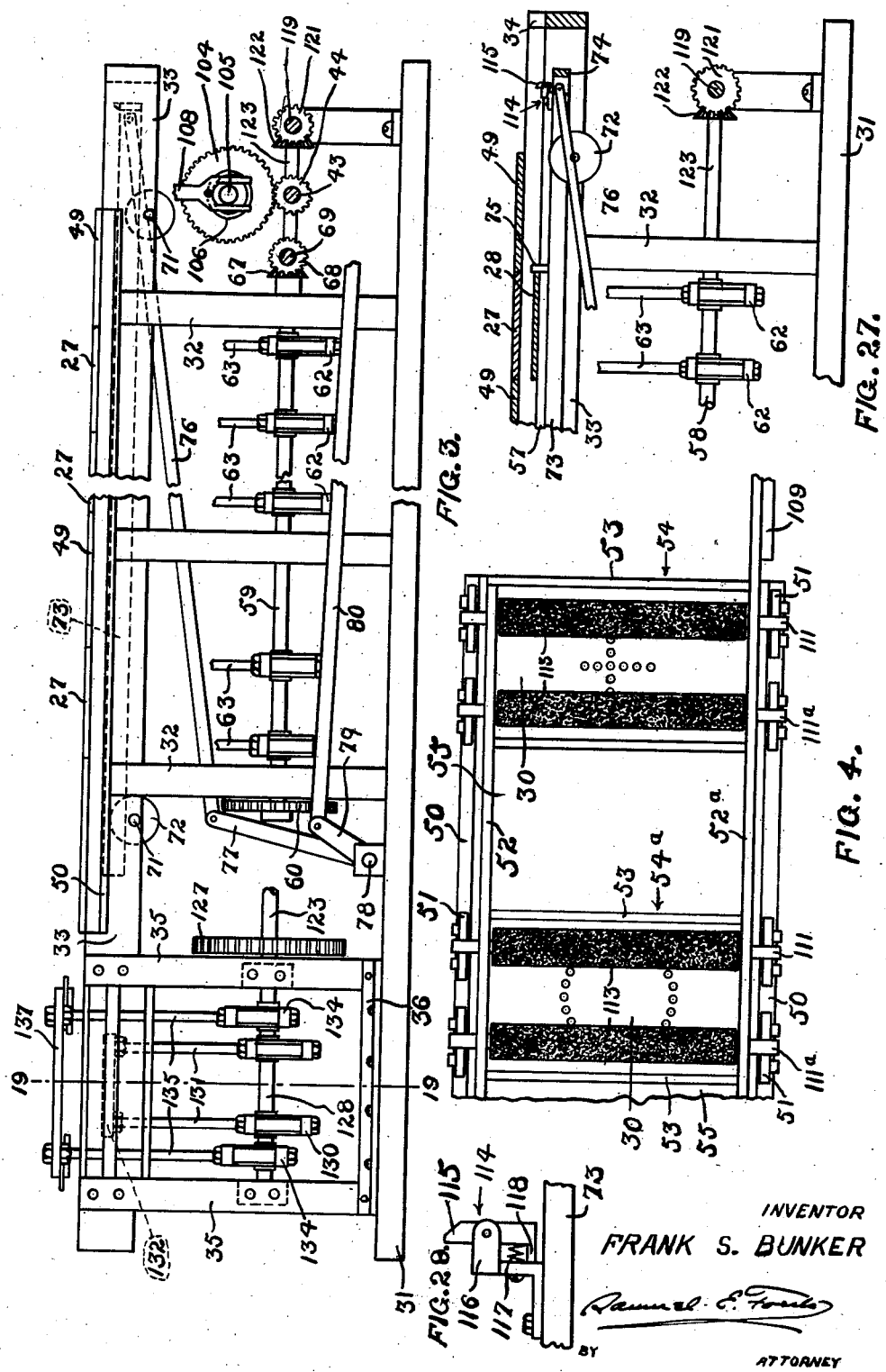
INVENTOR
FRANK S. BUNKER
BY
ATTORNEY Nov. 28, 1939.   F. S. BUNKER   2,181,573
MEANS FOR AFFIXING JEWELS IN PERFORATED PLATES
Original Filed Nov. 3, 1936   6 Sheets-Sheet 3

INVENTOR
FRANK S. BUNKER
BY
ATTORNEY

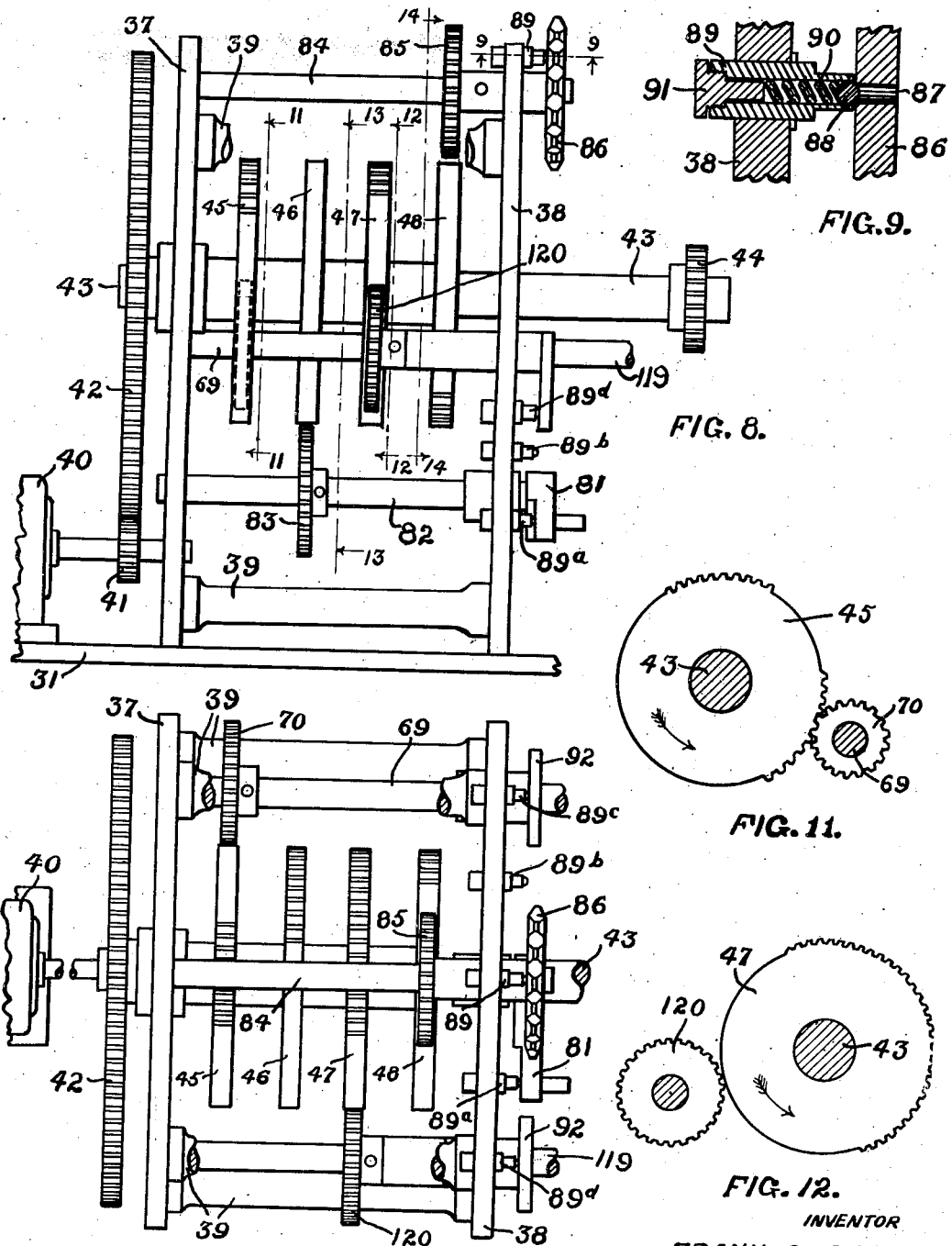

Nov. 28, 1939.　　　　F. S. BUNKER　　　　2,181,573
MEANS FOR AFFIXING JEWELS IN PERFORATED PLATES
Original Filed Nov. 3, 1936　　　6 Sheets-Sheet 5
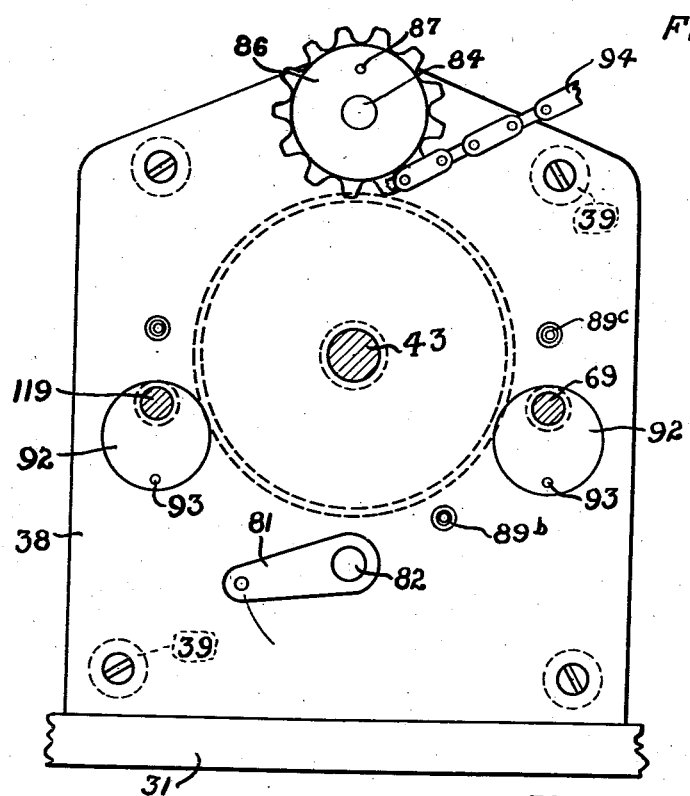
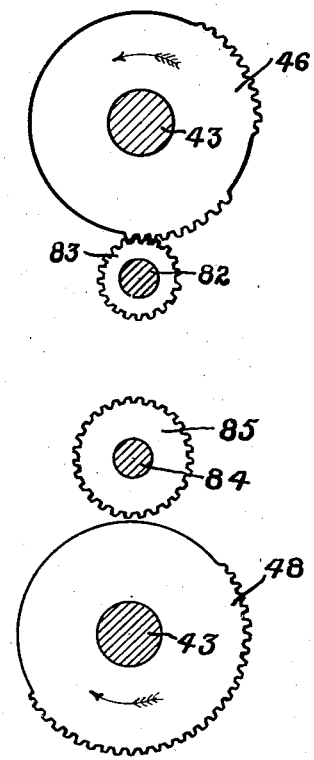
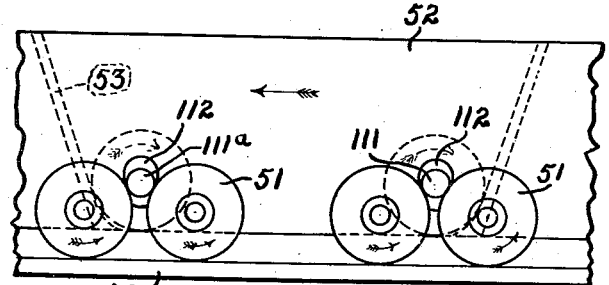
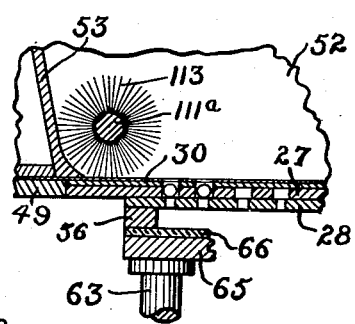
INVENTOR
FRANK S. BUNKER
ATTORNEY Nov. 28, 1939.　　　F. S. BUNKER　　　2,181,573
MEANS FOR AFFIXING JEWELS IN PERFORATED PLATES Original Filed Nov. 3, 1936　　6 Sheets-Sheet 6

INVENTOR
FRANK S. BUNKER
BY
ATTORNEY

Patented Nov. 28, 1939

2,181,573

UNITED STATES PATENT OFFICE 2,181,573

MEANS FOR AFFIXING JEWELS IN PERFORATED PLATES

Frank S. Bunker, Los Angeles, Calif., assignor to Arthur U. Magnan, Los Angeles, Calif.

Application November 3, 1936, Serial No. 108,958
Renewed April 26, 1939

28 Claims. (Cl. 41—1)

This invention relates to a means for selecting and affixing light-transmitting elements or jewels in the perforations of a plate. Generally, but not necessarily, these plates are intended for use in signs, the elements being so arranged as to form a design representing some words, figures, picture, symbol or the like. Since they are easily and cheaply procured, the elements are preferably imperforate spherical beads of various sizes and colors. Further, such beads are better adapted for use in the apparatus disclosed. It is to be understood, however, that light-transmitting elements of other shapes may be used if and when preferred.

In a prior application filed by me on January 27, 1936, Serial Number 61,047, I disclosed an apparatus for the same purpose. While that apparatus is entirely satisfactory in operation, it is somewhat complicated and is costly both in its manufacture and its preparation for use. Numerous blanking-out plates must be prepared for each separate design, and these plates must be made with great precision. Unless, therefore, a large order be received for a given design, the expense and time required for making ready the apparatus for producing the plates having that design do not warrant the use of that apparatus. It is cheaper to make up the plates by hand.

The principal object of my present invention is, therefore, the production of a new machine for the purpose stated which machine is relatively simple and inexpensive in its construction, which requires but little time and expense in adapting it for turning out jeweled plates and which is, therefore, capable of practical use in filling small orders for plates. A further object is the production of a machine which requires a minimum of attention on the part of the operator and which is capable of turning out fully jeweled plates in rapid succession. Other objects of the invention will be set forth in the following specification which describes the machine in what is, at present, its preferred form, it being understood that many changes in details of structure may be made without departure from the principles of the invention and that the appended claims are not intended to be limited to the details shown and described farther than their express terms require.

Figure 6:
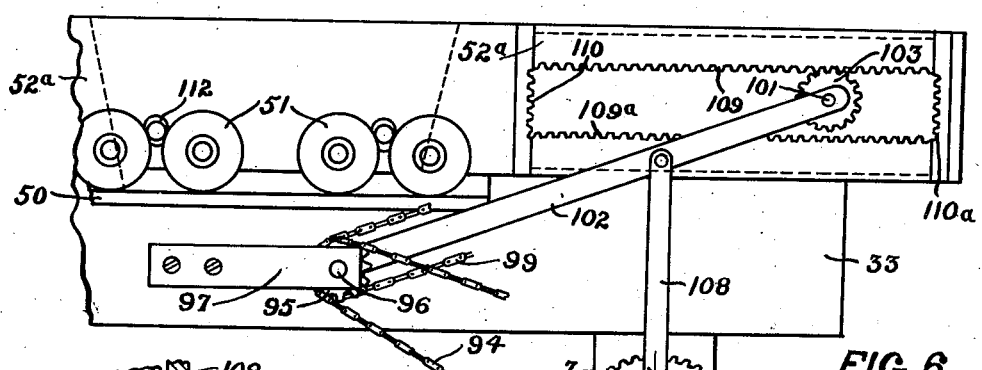
Figure 7:
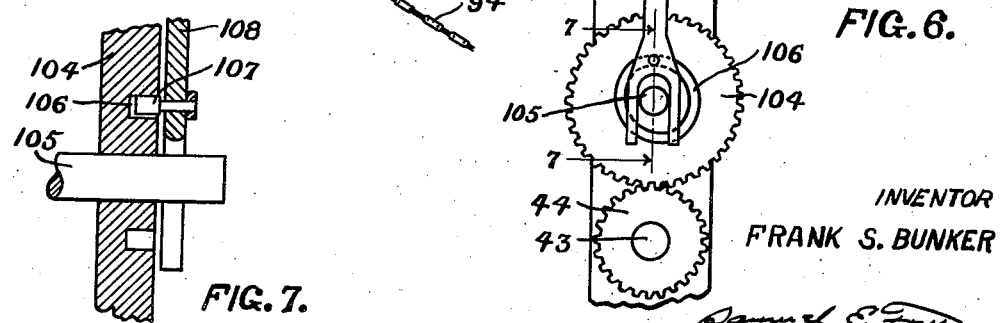
Figure 19:
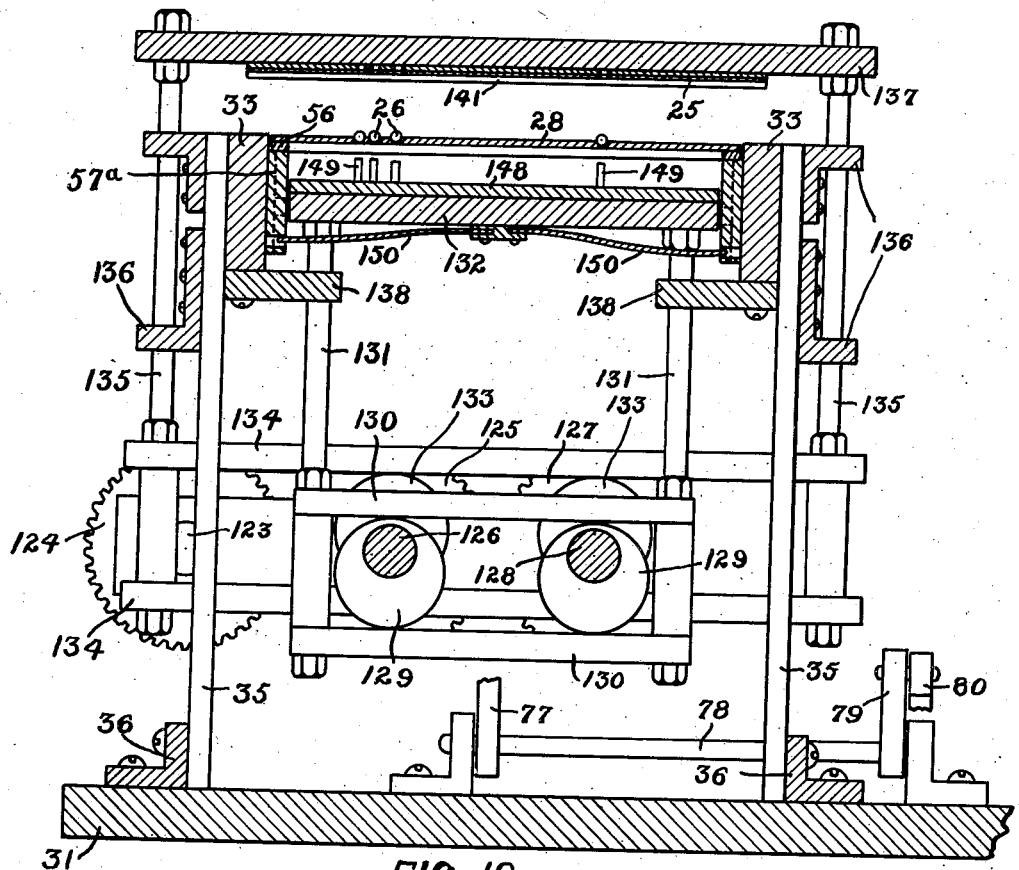
Figures 20, 21:
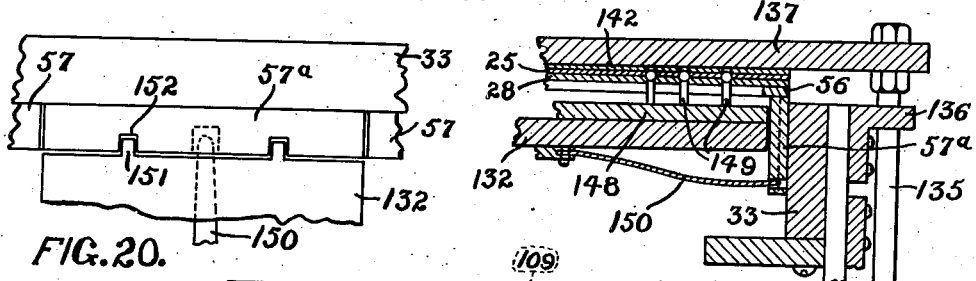
Figure 26:
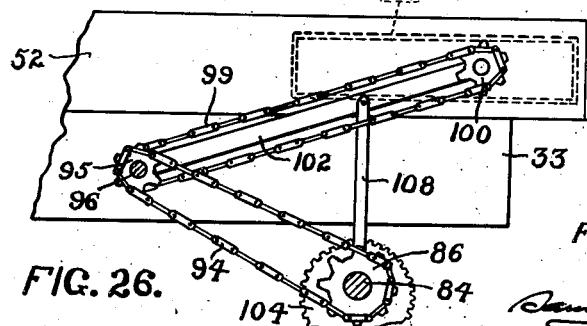

In the accompanying drawings, Fig. 1 is a plan view of the machine, the central part being broken away and other parts omitted for clearness of illustration; Fig. 2 is a side elevation of a sign plate which bears a simple design, the plate being representative of the plates which are jeweled in the machine; Fig. 3 is a side view, partly in section, of the structure shown in Fig. 1; Fig. 4 is a plan view of one end of the hopper structure, which structure is omitted from both Figs. 1 and 2; Fig. 5 is a transverse section taken substantially on line 5—5 of Fig. 1 and through the hopper; Fig. 6 is a side elevation of that end of the hopper structure that is shown in Fig. 4 with the means for reciprocating said structure; Fig. 7 is a section taken on line 7—7 of Fig. 6; Fig. 8 is an end elevation of the driving mechanism shown at the lower right-hand corner of Fig. 1 and looking toward the left; Fig. 9 is a section on the line 9—9 of Fig. 8; Fig. 10 is a plan view of the driving mechanism shown in Fig. 8; Fig. 11 is a section on line 11—11 of Fig. 8 and showing the mutilated gear from which certain parts are driven; Fig. 12 is a similar view on line 12—12 of Fig. 8 showing another mutilated gear for driving certain other parts of the machine; Fig. 13 is a similar view on line 13—13 of Fig. 8; Fig. 14 is a similar view on line 14—14 of Fig. 8 but looking toward the right whereas the other sectional views, Figs. 11 to 13, are viewed from the right; Fig. 15 is an elevation of the inner side of the frame of the driving mechanism; Fig. 16 is a side elevation showing a portion of the hopper frame and its supporting rail or track, said view also showing the means for rotating the brushes within the hopper; Fig. 17 is a section taken transversely through one of the hoppers, showing the brushes, the conductor plate with its perforated templet sheet or mask and a quantity of beads; Fig. 18 is a sectional view also taken transversely through one of the hoppers and showing the carrier plate lifted for receiving the beads from the conductor plate; Fig. 19 is a section taken vertically and transversely through the press, as on line 19—19 of Figs. 1 and 3; Fig. 20 is a plan view of a detail of the press; Fig. 21 is a sectional view showing the same detail, the press being closed; Figs. 22 and 23 are sectional views illustrating the position of certain parts at different stages of the method; Fig. 24 is a section through a sign plate at and adjacent one of the light-transmitting elements; Fig. 25 is a cross section through a part of the upper platen, as on line 25—25 of Fig. 1; Fig. 26 is a side elevation of the sprocket gears and chains for reciprocating the hopper frame; Fig. 27 is a section taken longitudinally through the right-hand end of Fig. 1, as on the line 27—27, and Fig. 28 is a side elevation of a detail.

Before proceeding with a description of the apparatus, I shall set forth briefly the method, reference being made to certain of the drawings. As will be understood, some sign plates have simple designs which require only three or four different kinds of beads. Other designs require a large assortment of beads. In this specification, I shall refer to the light-transmitting elements as beads and to the plate as a sign plate; but those terms are used in a generic sense and for the sake of brevity.

In Fig. 2, I have shown a sign comprising a rectangular plate 25 which has been perforated to form a simple design. Within each of the perforations is a bead 26. It is usual to employ beads of different sizes and colors. Thus, in the design shown, the cross may be made up of relatively large red beads, the surrounding circle of smaller beads of, say, amber color, and the outer rectangle of blue beads. In most signs a much greater variety of beads will be employed; but the three colors and/or sizes shown are ample to make the method clear. Having decided upon the design and the sizes or colors of the beads to be employed, a punching die is prepared, and plates 25 are punched. These plates are usually and preferably decorated on what is to be their front sides by painting, printing or otherwise impressing the design thereon, and the perforations are so arranged as to trace the more prominent features of the design. As many of these plates are thus made up as will suffice to fill any order that may have been received.

The next step in the method consists in punching, with the same punching die, a series of what I shall term conductor plates. There will be as many of these plates as there are varieties of beads in the sign to be made. In the simple design of Fig. 2, there will be three required. In more complicated designs there will be many more of these conductor plates, possibly as many as twenty. The material of these plates may be card-board, fiber or metal and their thickness is somewhat less than the diameter of the smallest bead to be used. I then punch, with the same punching die, another series of plates which I shall call carrying plates. There will be more of these carrying plates than the greatest number of varieties of beads the machine is adapted to use in making up the most complicated design. In Figs. 22 and 23 I have shown a section through both the conductor and the carrying plates, the same being designated 27 and 28 respectively. The perforations in the carrying plates remain just as they were punched; and so do the perforations in the sign plate. All of these perforations are slightlly smaller in diameter than are the beads which they are intended to receive. In the case of the carrying plates 28, the beads lie within the perforations, as shown in Fig. 22, with more than half of their bodies above the surface of the plate. In the sign plate 25, as shown in Fig. 24, the beads are pressed into their respective perforations, the walls of the perforations being forced outwardly, the material of the plate being densified as the largest diameters of the beads are forced into the perforations and then, due to its resilience, being contracted behind the said largest diameter, so that the beads are actually embedded in the material of the plate. Thus are the beads held in place; but to fasten them more securely and adapt them for rough usage, it is preferable to coat the plate and beads on that side from which the beads were inserted with a layer of transparent lacquer, or similar adhesive substance, as indicated at 29 in Fig. 24.

So, as stated, the perforations in the carrier plates remain just as they were punched. Those in the conductor plates, however, are enlarged to sizes which permit the respective beads to drop through them. At the times when the beads pass into these enlarged perforations, a carrier plate 28 is held against the lower side of the conductor plate with its perforations coaxial with the enlarged perforations so that the beads come to rest with their lower sides within the perforations of the carrier plate, as shown in Figs. 22 and 23. Before any beads are applied to the conductor plate, its upper surface is covered with a mask or templet 30 of paper or some other thin and tough substance, thus blanking out all the enlarged perforations, the mask being pasted or cemented in position. Then, with any suitable implement, the mask is punched through or is removed over the particular enlarged perforations which are to receive beads having one characteristic. In making up the plate shown in Fig. 2, for example, the perforations which are to receive the large red beads to form the cross are thus uncovered while all the other perforations are masked. If, then, an open-bottomed hopper containing a quantity of the large red beads be slid over the conductor plate, one of these beads will fall into each of the uncovered perforations and will come to rest in the registering perforations of the carrying plate. Only one of the conductor plates will have its mask removed over these particular perforations. Another will have those perforations uncovered which are to receive the amber beads of the circle. All the others, including those which correspond to the ones in the first conductor plate into which the red beads were dropped, remain masked. Then when another open-bottomed hopper containing amber-colored beads is slid over this second conductor plate, an amber bead is dropped into each of the enlarged perforations which make up the circle of the design. However, before this second hopper is thus moved, the carrier plate 28 must have been lowered from the position shown in full lines in Fig. 22 to that shown in dotted lines; and the plate must have been moved below the said second conductor plate and then lifted into contact therewith, as in Fig. 23, which shows both the red and the amber beads in position on the carrier plate, the red beads being covered by the mask 30. The third conductor plate has the perforations for the blue beads which are to form the outer rectangle unmasked while all the other perforations are closed. By lowering the carrier plate from the position of Fig. 23, sliding it edgewise until it is below and in exact register with the said third conductor plate, lifting it into contact therewith, and then moving a third hopper containing blue beads over the conductor plate, a blue bead will fall into each of the unmasked perforations. All of the perforations of the carrier plate are filled with their appropriate beads, and it remains only to move said carrier plate into register with the perforated sign plate and transfer the beads from the perforations of the carrier plate into the corresponding perforations of the sign plate. It will be noted that the beads rest loosely upon the carrier plate. Consequently, all the up and down and the horizontal movements of that plate must be made with a minimum of jar so as to avoid displacement of the beads.

Having transferred the beads from the carrier plate, said plate is ready for use in making up the bead assembly for another sign plate. It has not been changed or damaged in any way and may be used over and over again indefinitely.

It is believed that, with this description of the method, the apparatus for carrying it into effect will readily be understood. It must be provided with mechanisms for raising and lowering the carrier plates; for moving said plates horizontally from station to station; for moving the bead-hoppers back and forth over the conductor plates, and for operating the press. These mechanisms must be operated in perfectly timed relation, as will be obvious.

Taking up a detailed description of the apparatus by reference to the drawings, 31 represents the base of the frame of the main part of the machine, from which arises a plurality of spaced uprights or legs 32. The number of these legs depends upon the length of the machine and that depends upon the number of variations in the beads used. In Figs. 1 and 3, a portion of the frame is broken out, as the machine is quite too long to show it entire on the scale used. A sufficient number of legs are always employed to give the necessary rigidity to the frame. At their upper ends, the legs at each side are connected by elongated side bars 33 which extend, at their left-hand ends, beyond the last pair of the opposed legs 32 to form the side bars of the press frame. At their right-hand ends these bars are connected by a cross member 34. The press frame rests on the base 31 and comprises the uprights or legs 35 which are secured to the base by angle-irons 36, as best shown in Fig. 19. Also mounted on the base is the frame for the driving mechanism, the latter appearing at the lower right-hand part of Fig. 1 and being shown in detail in Figs. 8 and 10. The frame comprises a pair of parallel and upright plates 37 and 38 which are rigidly joined at or adjacent their corners by braces 39.

Power may be furnished by any suitable prime mover, such as an electric motor 40, the armature shaft of which has a pinion 41 which meshes with a large gear 42 outside the frame member 37. This gear is rigidly secured to a shaft 43 which is journaled in the frame plates 37 and 38 and projects beyond them on the side next to the main frame where it is provided with a gear 44 on the end, as shown in Figs. 5 and 6. The function of this gear will be set forth hereinafter. Secured to the shaft 43 between the frame plates are relatively large mutilated gears 45, 46, 47 and 48. As will be seen, the gear 45 drives the mechanism for lifting and lowering the carrying plates toward and from the conductor plates; the gear 46 drives the mechanism for shifting the said plates horizontally; the gear 47 drives the means for operating the press, while the gear 48 drives the mechanism for moving the bead hoppers over the conductor plates.

Except at its ends, the main frame is completely covered by transverse members to form a continuous table. The narrower members are the conductor plates 27 with their masks 30 (Fig. 22). The wider members are designated 49. Secured to the outer sides of the main frame are angle-iron tracks 50 upon which travel rollers 51 of the hopper frame. As best seen in Fig. 4, this frame comprises a pair of spaced longitudinal members 52 and 52a which are connected together by pairs of transverse plates 53. The plates of each pair are inclined upwardly and from each other to form the sides of a hopper, which is generally designated 54, 54a, etc. There will be as many of these hoppers as there are differently characterized beads used. There are no bottoms for these hoppers except what is provided by the conductor plates 27, their masks 30 and the plates 49 between the conductor plates. Joining the hoppers and the frame members 52 and 52a are horizontal plates 55. These, and the side plates 53 of the hoppers, brace the hopper frame to form a very rigid structure. The more detailed structure of the hoppers and of the means for moving the frame back and forth over the table will be described hereinafter. At the present time it is sufficient to state that the hoppers normally rest over the imperforate plates 49 and are moved back and forth from one to the next adjacent plate, thus crossing over the intervening conductor plates. In this travel, beads in the hoppers are dropped into such enlarged perforations of the conductor plates as are unmasked. But before they are thus dropped, the carrier plates 28 must be lifted to intercept them, as in Figs. 22 and 23. The means for lifting and lowering these plates will now be described.

The carrier plates are punched exactly like the sign plates 25. In fact, they may be sign plates, converted into carrier plates by providing them with marginal reinforcing frames 56 on their under sides, as shown in Figs. 5 and 23. These frames normally rest upon the upper edges of strips 57 and slide thereon when propelled by mechanism which will be described presently. These edges are below the upper edges of the side members 33 of the main frame, to which members the strips, the conductor plates 27 and the intermediate plates 49 are attached. Normally, therefore, the carrying plates 28 are spaced from the conductor plates, as in Fig. 5. In the lower part of the main frame are a pair of shafts 58 and 59. These shafts are parallel and are extended longitudinally of the frame beneath all the conductor plates 27. They are geared directly together by spur gears 60 so that they are turned in opposite directions. These shafts are provided with pairs of opposing eccentrics 61, one such pair being shown in Fig. 5. There are two pairs of these eccentrics for each carrying plate 28. Each pair operates between a pair of horizontal and parallel yoke members 62. At their ends, these members are rigidly connected together by lifting elements 63, which are projected upwardly through horizontally positioned guide plates 64. It is to be understood that there are two pairs of the eccentrics and two pairs of the lifting elements for each of the conductor plates 27 or, rather, for each of the carrier plates 28 which is in position below its conductor plate. Consequently, there are four of the lifting elements 63 for each of the said carrier plates, there being a pair almost below each of the side edges of the plate. The upper ends of each set of four of the lifting elements are connected with a platen 65 on the upper side of which is a plate 66 of rubber or other resilient material. When the platen is lifted, this resilient plate engages the frame 56 of the respective carrier plate and lifts the latter plate into contact with the conductor plate which is then above it, as in Fig. 23. The resilient plate yields and prevents damage to the plates yet holds them in close contact.

The shaft 59 is provided on its right-hand end (Figs. 1 and 3), with a beveled pinion 67, with which meshes a similar pinion 68 on a shaft 69 at a right angle to the shaft 59. The shaft 69 extends through the frame for the driving mechanism and is journaled in its side members 38 and 37. Near the latter member it is provided with a pinion 70 which is adapted to be engaged by the mutilated gear 45 on the main shaft 43. In the actual machine, all of the gears 45, 46, 47 and 48 would have 120 teeth each if they were not mutilated and had a full complement of teeth. It is difficult, and it is deemed unnecessary, to show so many teeth. Therefore, in Fig. 11, which shows the mutilated gear 45, two groups of ten teeth each are shown, the groups being separated by a blank space equivalent to ten teeth. This takes up half the rim. All the rest is blank. The pinion 70 is shown as having twenty teeth. In such a structure as is shown, the gear and pinion make the same number of rotations. But, whereas the gear turns continuously, the pinion turns intermittently. First, the group shown at the top turns the pinion a half rotation; then the pinion stops, due to the short mutilation. Then the second group completes the rotation of the pinion, and then the pinion comes to rest until it is again engaged by the said first group. The beveled gears 67 and 68 are of the same size and the shaft 59 makes as many turns as the shaft 69. Likewise, the spur gears 60 are of the same size, so that the shafts 59 and 58 turn together, but in opposite directions. This is advantageous since the tendency of one of the eccentrics 61 to move the yoke members 62 laterally in one direction is overcome by the tendency of the other eccentric of the pair to move it in the opposite direction. The eccentrics are, therefore, given one complete rotation for each rotation of their operating gear 45, but they turn only part of the time. Starting from the position shown in Fig. 5, they lift the platen 65 and it picks up and lifts the superimposed carrier plate into contact with the conductor plate. Then the platen rests while the long gap in the teeth of the gear 45 passes the pinion. While the platen is thus resting, the hoppers are moved to distribute the beads in the conductor plate. Then the parts return to their normal positions and come to rest again while the operating gear completes it rotation. It is to be understood that there is a platen 65 for each carrier plate that is below a conductor plate, and that all the platens move together. Preferably, each platen has its full complement of four eccentrics 61; although that is not necessary.

While the platens are at rest in their lowered positions, as in Fig. 5, the carrier plates are slid transversely to their next stations or below the next conductor plates. The means for effecting this operation will now be described.

Extending transversely across the machine frame from one side member 33 to the other are a plurality of rods 71, two being shown although, in a complete and full sized machine, others would be added, as required. On each rod is journaled a pair of rollers or spools 72 to support elongated push-bars 73. At their right-hand ends as viewed in Fig. 1, these bars are connected together by a member 74. The bars are moved back and forth longitudinally, rolling on the deeply-grooved spools 72, and they are below the carrier plates when the latter are in their lowermost position on the guide strips 57. However, when the carrier plates are in this position, they are adapted to be engaged by pins 75 which project upwardly from the push bars 73. The carrier plates with their frames rest on the strips 57 in spaced relation, being below the several conductor plates 27 and spaced distances corresponding to the width of the plates 49 between the latter plates. The pins 75 are spaced accordingly on the push bars and are in position to engage the respective carrier-plate frames 56 when the latter are lowered. When, however, these frames are lifted, they are above the pins and the push bars may be reciprocated without moving the carrier plates. These bars are moved, to the left as shown in Fig. 1, to push the plates. Then the plates are elevated by their respective platens 65 and, while in that position, the push bars are returned to the right, the pins passing beneath the plates. The bars are reciprocated by a long link 76 which is attached to the cross-member 74 midway between the bars. As best seen in Fig. 3, the link is connected at its opposite end to a crank-arm 77 on a transverse rock-shaft 78 which projects beyond the side of the main frame where it is provided with a crank arm 79. To the latter arm is pivoted a link 80, which extends to the right, Fig. 1, and connects with a crank-arm 81 on the inner side of the frame for the operating mechanism, the arm 81 being rigidly secured upon a shaft 82 of said mechanism. As shown in Fig. 8, this shaft is journaled in the frame members 37 and 38 and is provided with a gear 83 which is driven by the large mutilated gear 46. This gear is shown in side elevation in Fig. 13. It is the same size as the gear 45 and, like it, is shown with its teeth so pitched that, if it were not mutilated, it would have sixty teeth. It may here be stated that all the gears 45, 46, 47 and 48, as well as the pinions with which they mesh, are shown with but half the teeth I prefer; but the ratios are preserved. The pinion 83 is, therefore, shown as having twenty teeth. The gear 46 has a group of eleven teeth, then a blank space of the width of six teeth, then a group of nine teeth and then a long blank space of the width of thirty-four teeth. In Fig. 13 the gear is supposed to turn anti-clockwise. The pinion 83 is coming to rest with the crank 81 in its right hand position shown in Fig. 1. That is to say, the crank then extends in the same direction as the long link 80 and the latter is in its dead center position. When in that position, the push bars 73 are in their extreme backward position with their feed pins 75 ready to engage their respective carrier-plate frames 56 when the latter are lowered onto the guide strips 57. The gear 46 rotates constantly, and it turns through more than a half rotation before the group of eleven teeth comes into mesh with the pinion. Then this group turns the pinion and its shaft 82 slightly more than a half rotation, with the result that the push bars 73 are given their full forward and feeding movement and are returned a short distance before the said group passes out of mesh and the short blank space comes opposite the pinion. While this space is passing the pinion the push bars are at rest. Then the group of nine teeth comes into mesh and completes the return of the push bars. In explanation of this grouping of the teeth on the gear 46, it may be stated that if the first group contained but ten teeth the push bars would be given their complete feeding movement but the feed pins 75 would be left in contact with the carrier frames and would or might interfere with the upward movement of the frames which takes place as soon as the pins are withdrawn. For it will be remembered that the carrier plates have beads resting loosely thereon and nothing can be permitted to cause jarring or otherwise interfere with the perfectly smooth and steady movements of these plates. But if the short gap in the gear teeth were not provided to cause the push bars to halt on their return movement, the pins 75 would be liable to engage the carrier-plate frames and push them backwardly so that they would be out of register with the conductor plates. It is while the push bars are thus at rest that the carrier plates are lifted or are raised sufficiently to permit the feed pins to pass freely below them when the push bars are returned by the group of nine teeth. From the above it will be appreciated that it is necessary so to arrange the groups of teeth on the several mutilated gears as to coordinate the movements of the groups of mechanisms of the machine. That group which effects the movements of the hopper frame will now be described, attention being directed particularly to Figs. 6, 8, 10 and 15.

In the upper part of the frame for the operating mechanism and journaled in the frame members 37 and 38 is a shaft 84, the same having a pinion 85 thereon which is adapted to be engaged and rotated by the mutilated gear 48. As will be noted from Fig. 14, just half of the teeth are omitted from the gear 48. The pinion 85 is but half the size of the gear so that it is given one complete rotation at every turn of the gear. On the end of the shaft 84 which projects beyond the frame member 38 is a sprocket wheel 86. In order to assure that the rotation of the wheel will stop at the end of a complete turn and not overtravel, the wheel is provided with an aperture 87 through it, as seen in Fig. 9, into which an element, preferably a ball 88, is adapted to enter just as the wheel comes to the end of its movement. Any suitable means for holding this ball may be employed, that shown comprising a tubular housing member 89 which is secured to the adjacent frame member 38. Within the member 89 is the ball and a spring 90 which forces it toward the wheel 86. The tension of the spring may be regulated by a plug 91 which is screw-threaded into the end of the housing opposite the ball. Similar overthrow preventers are employed to engage the crank 81 which operates the push bars 73, the same being shown at 89ª and 89ᵇ. Others of the same character are shown at 89ᶜ and 89ᵈ, the first to arrest the rotative movements of the shaft 69 and the latter to perform the same function for a shaft for operating the press, presently to be described. Both of these shafts are provided with an eccentrically-shaped disk 92 which turn therewith, each disk having an aperture 93 with which the ball 88 engages, as in Fig. 9. The disks 92 are best shown in Fig. 15. If preferred, simple crank arms, like 81, could be used instead of the disks.

The sprocket-wheel 86 drives a chain 94 which is passed about a sprocket wheel 95; the latter being journaled on a pin 96 which projects outwardly from the side member 33 of the main frame, being braced by a bracket member 97 on the said frame. Rigidly connected with the wheel 95 is another sprocket wheel 98 on the same pin 96, over which wheel passes a sprocket chain 99 which extends to and about a similar sprocket wheel 100. The latter wheel is on a shaft 101 which is journaled in the end of a link-bar 102. On the shaft and on the side of the link-bar which is opposite the wheel 100 is a pinion 103. The link-bar is pivoted on the pin 96 and is adapted to be rocked up and down to raise and lower the pinion. The sprocket wheels 95, 98 and 100 are of the same size and are just half as large as the sprocket wheel 86. Therefore, for each rotation of the wheel 86, the pinion 103 is given two complete turns. The link-bar 102 is rocked by the means shown in Figs. 5, 6 and 7, which includes the pinion 44 at the inner end of the drive shaft 43. This pinion meshes with a gear 104 which is just twice its size, so that one complete rotation of the pinion gives the gear a half turn. The gear is journaled on a pin 105 which projects from one of the frame uprights 32. In one face of the gear is a cam-race 106, into which projects a pin having an anti-friction roller 107. This pin projects from a pitman 108, the upper end of which is pivoted to the link-bar 102. The lower end of the pitman is forked to bestride the pin 105 and be guided by it. As shown in Fig. 6, the cam race 106 is formed of two lobes of 180° each, their ends merging. Both lobes are concentric with the pin, but the radius of the upper lobe is slightly longer than is that of the lower lobe. Consequently, when the roller 107 is in the upper lobe it and the pitman are in their upper positions and are held positively in that position until the roller passes into the lower half of the cam-race, when the roller and pitman are lowered and are so held until the roller again passes into the larger part of the race. These movements of the pitman raise and lower the pinion 103 to bring it into mesh with first one and then the other of a pair of parallel racks 109 and 109ª. These racks are secured to the outer side of the side member 52ª of the hopper frame. The sprocket wheel 86 and the gear 104 having the cam-race are so timed that the pinion 103 is given two complete turns while it is in mesh with the rack 109 and is being transferred to mesh with the rack 109ª. Then the pinion stops its rotation while the toothless half of the mutilated gear 48 is passing its pinion 85. When the toothed part of the gear again engages the pinion, the pinion 103 is again given two complete turns while it is in mesh with the rack 109ª and is being transferred back to the rack 109. These turns of the pinion cause the hopper frame to move back and forth over the conductor plates 27. When the frame is at rest, the hoppers are over the imperforate plates 49 between the hoppers. The two rotations of the pinion 103 is sufficient to move a hopper from one to the next adjacent plate 49, crossing the conductor plate therebetween and depositing the beads in the hopper into such enlarged perforations of the conductor plate as are unmasked. To assure that the pinion will always come properly into mesh with the racks 109 and 109ª, I prefer to connect the ends of the racks with short racks 110 and 110ª having teeth with the same pitch as the teeth of the racks. The four racks form a rectangle and the pinion is always in mesh with one of them.

The means described for operating the hopper frame is but one of several that are adapted for this use and the claims which call for means for moving the hopper frame are not to be considered as limited to the means as shown and described.

A more detailed description of the hoppers will now be given and attention is directed particularly to Figs. 16, 17 and 18. Four pairs of wheels 51 are provided for each hopper. These wheels roll on the tracks 50 of the main frame. The two wheels of a pair are slightly spaced and the two pairs at a side of the hoppers form roller bearings for a floating shaft 111 and 111ª which extends longitudinally through the hopper and through slots 112 in the side members 52 and 52ª of the hopper frame. Within the hopper, the shafts are provided with bristles or other suitable elements to form cylindrical brushes 113. Assuming that the hopper of Fig. 17 is moving toward the left, the rollers 51 will be turning anti-clockwise, while the brushes will be turning in the opposite direction. Without the brushes or some equivalent means, the beads 26 would tend to jam under the right hand side wall of the hopper. But the brush at that side sweeps back the beads and keeps them from the wall. The brush at the opposite side wall is also turning and in a direction to sweep the beads toward that wall. But the hopper itself is so moving as to carry that wall away from the beads and there is no tendency for the beads to jam under it until the movement of the hopper is reversed. Then, however, the rotation of the brush is reversed and it sweeps the beads away from the wall.

It remains now to describe the press and its operating mechanism. As has been stated, the side members 33 of the main frame are continued through the press and even beyond the press proper, as shown at the left in Fig. 1. The guide strips 57 for the carrying plates are likewise carried through and beyond the press, so that said plates, after receiving their full complement of beads may be pushed into the press, where their beads are transferred to the sign plates, and then out of the press and onto the extension at the left from which they may be manually moved. These movements of the plate are effected by the push-bars 73 and their pins 75, as previously described. These plain pins are used on those parts of the push-bars where they engage the carrying plates while the latter are in positions to be lifted by the eccentrics 61, the platens 65 and the connecting yokes 62–63. It is feasible to use the plain pins in these locations because they can be moved backwardly while the carrier plates are elevated. But pushing elements are required at or near the ends of the push-bars beyond the platens where the carrier plates are not lifted from their guide strips 57. Such elements must be capable of engaging and feeding the plates while the bars are moving forwardly, but they must pass below the plates without moving them backwardly when the bars are returning to their normal positions. Such an element is shown generally at 114 in Fig. 27 and, on a larger scale in Fig. 28. It comprises a pawl 115 which is pivoted adjacent its center to a bracket 116 on the push-bar 73. The lower part of the pawl is drawn toward the left by a light pull-spring 117, but is prevented from swinging too far in that direction by a lug 118 on the pawl which engages with the bracket. When the bar 73 is moved to the right and the pawl is dragged beneath a carrier-plate, the pawl swings upon its pivot against the tension of the spring 117; and, as soon as it fully passes the plate, it snaps back to its normal position ready to engage with and push the next plate. One of these pawls is employed at the right-hand ends of the push bars where it facilitates feeding the empty carrier plates into the machine. Another pair is used adjacent the left-hand ends of the bars beyond the lifting platens. These pawls push the filled carrier plates step by step toward, into and beyond the press.

Journaled in the main frame and also in the side members 37 and 38 of the frame of the operating mechanism is a horizontal shaft 119. Near one of its ends, in position to be engaged by the mutilated gear 47, is a pinion 120. Just outside the frame member 38, the shaft is provided with one of the eccentric-shaped members 92, previously described, with an aperture 93, in which one of the overthrow preventers of Fig. 9 is adapted to engage. This preventer is designated 89$^d$. Just half the perimeter of the gear 47 is provided with teeth to rotate the pinion 120 and its shaft 119 one complete turn at each complete rotation of the gear. At its opposite end outside the main frame, the shaft has a beveled pinion 121 which meshes with a similar pinion 122 on a long shaft 123 which extends to the press frame. On that end it is provided with a spur gear 124 which meshes with a similar and equal-sized gear 125 on a shaft 126 which is journaled in the side frame members of the press. The gear 125 meshes directly with a similar and equal-sized gear 127 on a second shaft 128, also journaled in the press frame, the shafts 126 and 128 being parallel. Each of these shafts has four pairs of eccentrics, the eccentrics of two of the pairs being designated 129. All these eccentrics bear the same relation with respect to their respective shafts; that is to say, their thickest parts are on the same sides of the shafts. In Figs. 3 and 19, these eccentrics are turned downwardly. They operate between members 130 of a yoke, from the ends of which rise the lifting elements 131 of the lower press platen 132. Fig. 3 shows two of these lifting elements, but it is to be understood that there are two more directly back of those shown. There is, therefore, a lifting element at each corner of the lower platen, and they all move together to raise and lower the platen and to maintain it in a horizontal plane. The other eccentrics are designated 133 and they stand out from the shafts 126 and 128 at an angle which is exactly opposed to the angle of the eccentric 129. The eccentrics 133 work between the parallel yoke bars 134, from the ends of which rise the depressing elements 135. These elements are guided for vertical movement by members 136 outside the side members of the press frame, and at their upper ends they are rigidly attached to the upper platen 137. The lifting elements 131 for the lower platen are guided by members 138 inside the side members of the frame. From this description it will be understood that the platens 132 and 137 are maintained in parallel relation and are moved in opposite directions. In Fig. 19 they are shown in their normal or open positions. While in that position the carrier plate 28, with the beads resting loosely thereon, is pushed in between them.

As best shown in Fig. 1, the upper platen 137, which is partly broken away, is rectangular in its general outline, its longer dimension being transverse to the longer dimension of the main frame. One of its ends is suitably notched, preferably in a V shape, as shown at 139. On its under side it is provided with suitable slide-ways extending longitudinally and parallel to its side edges. Fig. 25 shows a section through what may be called the inner slide-way. It is formed by riveting or otherwise securing a pair of strips or plates 140 and 141 to the platen 137, the strip 141 extending inwardly or toward the center of the platen farther than the strip 140 to leave a space or slide-way for the sign plate 25. For reasons hereinafter explained a second sign plate perforated exactly as the plate 25 is inserted with the sign plate, said second plate being designated 142. The inner edge of the plate 140 is hidden in Fig. 1 by the platen, but its outline is indicated by dotted lines, from which it will be noted that it is provided with a pair of inwardly extending humps against which the plates 25 and 142 bear. In Fig. 1, the opposite edge of the platen is shown as partly broken away to reveal a plate 144, the same corresponding to the plate 140. However, it has a straight inner edge except that it is notched to receive a push pawl 145. This pawl is in the plane of the plates 25 and 142 and bears against their outer edges to push them inwardly against the humps 143 on the opposing plate 140, the pawl being impelled by a spring 146. The said humps and the pawl correctly register the plates at their longitudinal edges. At their rear edges, or their upper edges as shown in Fig. 1 they are registered by a stop-pin 147 which projects downwardly from the platen. The platen is notched at 139 to expose enough of the plates 142 and 25 to enable the operator to grasp them in inserting them into and removing them from the press.

The perforations in each of the sign plates, the conductor plates and the carrier plates are punched simultaneously by a die comprising a flat backing plate from one side of which the punching pins project. A die exactly like it except that the pins project from the opposite side is used in the press for pushing the beads from the carrier plates into the sign plates. This transferring die is shown in Figs. 19 and 21. It comprises a backing-plate 148 and the upwardly projecting pins 149. The plate 148 is correctly positioned to lie flat upon the lower press platen 132 with its pins directly under the respective perforations in the carrier plate 28. Before the press starts to close, the carrier plate frame 56 is in the plane of the upper edges of the guides 57 upon which it was slid through the main frame and into the press above the lower platen and above the pins 149. The said frame 56 now rests upon sliding sections 57ᵃ of the said guides, the latter having cut-away portions to receive said sections. Normally, therefore, the upper edges of these sections are in the plane of the upper edges of the guides; but the sections are resiliently supported by springs 150 which are rigidly attached to the lower side of the platen. As the press closes, these sections rise with the lower platen and lift the carrier plate until the latter comes into face-to-face contact with the descending face plate 25. Not only can the carrier plate rise no farther, but it is actually depressed by the further downward movement of the upper platen 137. This further movement of said platen and the simultaneous further upward movement of the lower platen 132 depress the carrier plate and the sections 57ᵃ and cause the pins 149 to enter the perforations in the carrier plate and to push the beads 26 into the face plate perforations which are in register with them. The depression of the sections pushes down the outer ends of the springs 150 while the inner ends of the springs are still rising, so that the springs are placed under greater and greater tension. At the end of the closing movement of the press, this tension is sufficient to press the beads into their respective perforations in the face plate, as shown in Fig. 24. The beads are then so embedded in the face plate that they retain their positions when the press is opened and the face plate is removed from the press, ready to receive its coating 29 if such coating be considered necessary. The sections are guided in their movements not only by the springs 150 but by guide lugs 151 on the lower platen which project into grooves 152 in the sections.

When the beads are in position in the face plate they should project substantially equal distances beyond its sides. If the face plate lay flat in contact with the upper platen, the beads would be pushed against the platen and would be prevented from entering the face plate to the required depth. But the plate 142 is placed between the platen and the face plate and the perforations in it provide depressions into which the beads may enter so that the beads may become substantially centered in the face plate. Or, instead of using a perforated plate 142 like the face plate, a sheet of resilient material, such as rubber, could be employed. This sheet would yield under the pressure applied to the beads and permit the beads to center themselves in the face plate.

Having described my invention, I claim:

1. In a machine for the purpose specified, a plurality of plates having perforations therethrough, a plurality of containers for beads, there being a container for each of said plates and the beads in each container differing in some characteristic from the beads in any of the other containers, means for closing all of the perforations in each of the plates except those which are to receive beads having some particular characteristic, and means for moving the containers over their respective plates whereby the uncovered perforations in each plate receive beads having the appropriate characteristic.

2. A machine as set forth in claim 1 in which the means for closing the perforations is a thin sheet of material covering the plate which is punctured at those perforations of the plate which are to receive beads.

3. A machine as set forth in claim 1 having a frame in the upper part of which the said plates are disposed in spaced relation and in a horizontal plane.

4. A machine as set forth in claim 1 in which the perforations in the plate are larger in diameter than are the beads which they are to receive so that the beads fall through the perforations as the containers are moved over the plates.

5. In a machine for the purpose specified, an elongated frame, guide rails extending longitudinally of said frame, a plurality of perforated plates on said frame above the said rails, the perforations in said plates being so arranged as to form a design, a frame movable over said plates and provided with a plurality of containers for beads, said containers having open bottoms with the beads therein in contact with the said plates, the beads being smaller than the perforations in the plates so that they may drop into the perforations, means associated with each of the said plates to close all of the perforations therein except those into which beads are to be dropped, a carrier plate below the said perforated plates and resting on said guide-rails, means for moving the carrier plate step by step from one of the perforated plates to the next, means for lifting the carrier plate into face-to-back contact and in register with each of said perforated plates and for lowering it after such contacts to the said guide ways, and means for moving said bead containers over the perforated plates while the carrier plate is in such contact, whereby the beads which drop into the uncovered perforations come to rest on the carrier plate and are thereafter moved with it.

6. A machine as set forth in claim 5 in which each container contains beads having some characteristic which distinguishes them from the beads in the other containers and in which the unclosed perforations in the perforated plates differ in positions so that the beads passing through them come to rest in different places on the carrier plate.

7. A machine set forth in claim 5 in which the carrier plate is moved on the guide-ways by means of reciprocating bars having means thereon which engage the plate after it has been lowered to the said guide-ways.

8. In a machine for the purpose specified, an elongated frame, guide-rails extending longitudinally of the frame, a plurality of regularly-spaced perforated conductor plates, spacing plates between the conductor plates, all of said plates, when assembled, forming a continuous horizontal table supported by said frame, a frame movable over said table and carrying a plurality of containers for beads, the beads rolling upon the upper surface of the table as the containers are moved, and the containers being spaced in accordance with the spacing of the conductor plates so that each of said plates has its own container, means for moving the container frame back and forth to carry the containers over the respective conductor plates, the beads in each container having some characteristic which distinguishes them from the beads in the other containers, a carrier plate normally resting on said guide rails and having perforations, the perforations in all the conductor plates and in the carrier plate being so arranged as to form a design and the perforations in the conductor plates being larger in diameter than the beads, means associated with each of the conductor plates for closing all of the perforations in said plates except those which are to receive the beads from the respective containers, means for moving the carrier plate step by step beneath the successive conductor plates and means for lifting the carrier plate into face-to-back contact and in register with the conductor plate above it and for holding it in such contact while the container for that conductor plate is moved over the latter, whereby beads from that container drop into the uncovered perforations and come to rest upon the carrier plate to be moved with said plate, while it is being moved to and lifted against the next conductor plates to receive other beads through the uncovered perforations of that plate.

9. A machine as set forth in claim 8 in which the means associated with the conductor plates for closing the perforations therein consists of a sheet of thin material cemented to the upper surface of the said plates and punctured at those perforations which are to receive beads.

10. A machine as set forth in claim 8 in which the elongated frame is provided with track-rails upon which the frame for the containers is moved.

11. In a machine for the purpose specified, an elongated frame, guide-rails extending longitudinally of the frame, a plurality of regularly-spaced conductor plates, spacing plates between the conductor plates, all of said plates, when assembled, forming a continuous table supported by said frame, a frame movable over said table, and carrying a plurality of containers for beads, the beads rolling upon the table as the containers are moved and the containers being spaced in accordance with the spacing of the conductor plates so that each of said plates has its own container, means for moving the container frame back and forth to carry the containers over the respective conductor plates, the beads in each container having some characteristic which distinguishes them from the beads in the other containers, a plurality of carrier plates normally resting on said guide-rails and having perforations, the perforations in all the conductor and carrier plates being so arranged as to form the same design and the perforations in the conductor plates being larger in diameter than the beads, means associated with each of the conductor plates for closing all of the perforations in said plates except those which are to receive the beads from the respective containers, means for simultaneously moving the carrier plates step by step in spaced relation on said guide-ways and bringing them to rest, each beneath a conductor plate, means for simultaneously lifting said carrier plates into face-to-back contact with the respective conductor plates with the perforations in the conductor and carrier plates in registration and for holding them in such contact while the containers are moved over the conductor plates, whereby beads from the containers are dropped into the uncovered perforations in the respective conductor plates and are brought to rest over the perforations in the respective carrier plates, said means for lifting the carrier plates then operating to lower said plates to the guide rails and the means for moving the carrier plates on the rails then operating to move said plates another step to new positions under the conductor plates.

12. A machine as set forth in claim 11 in which the means for moving the carrier plates step by step on the guide rails comprises a pair of pushbars, means for reciprocating said bars in a plane which is parallel with the plane of the guide-rails and means spaced on said push-bars for engaging the carrier plates while said plates are in position on the guide rails and for moving said carrier plates, said engaging means being spaced in accordance with the spacing of the conductor plates, for the purpose specified.

13. A machine as set forth in claim 11 in which the means for lifting and lowering the carrier plates comprises a pair of parallel shafts, gears connecting said shafts, means for turning said shafts intermittently, pairs of opposing cams on said shafts, a yoke for each of said pairs of opposing cams, there being two yokes for each carrier plate, and means connecting the said two yokes for engaging the respective carrier plate.

14. A machine as set forth in claim 11 in which each of the carrier plates is provided with a marginal frame, which frames rest upon the guide rails when the plates are in their lowered position.

15. A machine as set forth in claim 11 in which the means for lifting the carrier plates comprises a mutilated gear, a pinion adapted to mesh with said gear to be given a half-rotation, then stopped, then given another half rotation and again stopped for each rotation of the said gear, means for rotating said gear with a continuous motion, a pair of parallel shafts extending longitudinally of the elongated frame, gears connecting said shafts, means connected with said pinion for rotating said pair of shafts, pairs of opposing cams on said shafts, a yoke for each pair of opposing cams, there being two yokes for each carrier plate, and means connecting the said two yokes for engaging with and lifting the respective carrier plate into contact with the respective conductor plate, holding it in such contact and then lowering it to the guide rails.

16. A mechanism as set forth in claim 11 in which the means for moving the carrier plates on the guide rails comprises a pair of connected push-bars having means thereon for engaging the said plates when they are resting upon said rails, a continuously rotating drive shaft, a mutilated gear on said shaft, a pinion adapted for meshing with said gear to be rotated intermittently by it, a rock-shaft, two crank-arms on said rock shaft, a link connecting one of said crank arms with said pinion whereby the rock shaft is rocked, and a second link connecting the other crank-arm with the said push-bars, the arrangement and number of teeth on the mutilated gear and the number of teeth on the pinion being such that the push-bars are first given a complete feeding movement and a partial return movement, then a stop, then the remainder of the return movement and then another stop, as and for the purpose specified.

17. A machine as set forth in claim 11 in which the means for moving the container frame back and forth over the table comprises a drive shaft, means for rotating said shaft with a continuous motion, a mutilated gear secured to said shaft, a pinion adapted to be meshed with said gear, the teeth on the gear being so arranged and the number of teeth on the gear being such that the pinion is first given one complete rotation while the gear is making a half turn and is then stopped while the gear completes its turn, a pair of parallel racks on the container frame, a pinion adapted for meshing alternately with said racks, connections between the said pinions whereby the last mentioned is driven from the first mentioned pinion, and means controlled from the said drive shaft for shifting the last mentioned pinion from one rack to the other, the construction being such that the container frame is moved in one direction when the pinion is in mesh with one rack and is returned to its original position while the pinion is in mesh with the other rack.

18. In a machine for the purpose specified, an elongated frame, a press frame at the rear end of the elongated frame, guide rails extending longitudinally of the elongated frame and into the press frame, a plurality of carrier plates normally resting on the guide rails on which they are moved, said plates all being perforated and the perforations so arranged as to form the same design, means to deposit beads in the said perforations while the plates are within the elongated frame, means for moving the carrier plates step by step on the guide rails in the direction of and into the press frame, a sign plate supported within the press frame, said sign plate being perforated in exact accordance with the perforations in the carrier plates, and means within the press frame for transferring the beads from a carrier plate into the corresponding perforations in the sign plate.

19. A machine as set forth in claim 18, in which the means for transferring the beads comprises a press platen and a die carried by said platen, said die having a projecting pin thereon for each of the perforations in the carrier plate, and means for moving the platen toward the carrier plate to cause the said pins to enter the respective perforations and push the beads into the corresponding perforations in the sign plate.

20. A machine as set forth in claim 18 in which the means for transferring the beads comprises a pair of press platens in parallel planes and movable toward and from each other to close and open the press, means on one of said platens for holding the perforated sign plate, a die carried by the other platen and having pins thereon adapted to enter the respective perforations in the carrier plate when the press is closed to engage the respective beads on the latter plate and push them into the corresponding perforations in the sign plate, and means for moving the said platens in opposite directions to close and open the press.

21. A machine as set forth in claim 18 in which that part of each of the guide rails which is within the press frame is provided with a slidable section upon which the carrier plate that is in position to have its beads transferred is supported, a press platen below the carrier plate when it is supported on said sections, and resilient means connecting the platen and said sections, said means yieldingly supporting the carrier plate while the beads are being transferred.

22. In a machine for the purpose specified, an elongated frame, a press frame at the rear end thereof, guide rails extending longitudinally of the elongated frame and into the press frame, a plurality of carrier plates normally resting on the guide rails on which they are moved, said plates all being perforated and the perforations so arranged as to form a design, means supported by the elongated frame to deposit beads in the said perforations while the plates are within the elongated frame, a constantly rotatable power shaft, a mutilated gear secured to said shaft, a pinion adapted to be meshed with said gear, a pair of parallel driven shafts within the press frame, gearing connecting said driven shafts with said pinion, a pair of platens within the press frame and means connecting said platens with said driven shafts to move the platens toward and from each other, a sign plate perforated in exact accordance with the perforations in the carrier plates carried by one of said platens and means supported by the other platen for transferring the beads in a carrier plate into the corresponding perforations in the sign plate as the platens are moved toward each other.

23. A machine as set forth in claim 22 in which the said other platen is provided with springs and means supported by the springs and located beneath the carrier plate for lifting the latter and holding it yieldingly against the sign plate while the beads are transferred thereto.

24. A machine as set forth in claim 22 in which the means connecting the platens with the driven shafts comprise oppositely-extending cams on said shafts, and yokes connecting the cams and the platens, the cams which extend in one direction being connected with one of the platens and the cams which extend in the opposite direction being connected with the other platen, whereby the platens are moved simultaneously but in opposite directions.

25. A machine as set forth in claim 22 in which the sign plate on one of the platens is backed by a plate between it and the platen, said latter plate being adapted to permit the beads to be pressed into the sign plate and be substantially centered therein.

26. A machine as set forth in claim 22 in which the sign plate on one of the platens is backed by a perforated plate between it and the platen, said backing plate having its perforations registered with the corresponding perforations in the sign plate, whereby the beads which are pressed into the latter perforations may extend into the perforations in the backing plate and the beads may be substantially centered in the sign plate.

27. In a machine for the purpose specified, a plurality of plates having perforations therethrough, a plurality of containers for beads, there being a container for each of said plates and the beads in each container differing in some characteristic from the beads in any of the other containers, means for closing all the perforations in each of the plates except those which are to receive beads having some particular characteristic, means for moving the containers back and forth over their respective plates with the beads therein rolling on the plates and falling into the uncovered perforations therein, and brushes in the containers for sweeping the beads back from the wall that is in the rear as the containers move.

28. A machine as set forth in claim 27 in which means are provided for rotating the brushes as the containers move.

FRANK S. BUNKER.